United States Patent
Feng et al.

(10) Patent No.: US 10,033,304 B2
(45) Date of Patent: Jul. 24, 2018

(54) PIEZOELECTRIC IMPACT ENERGY HARVESTING

(71) Applicant: Analog Devices Global, Hamilton (BM)

(72) Inventors: Yong Feng, Shanghai (CN); Xing Li, Hong Kong (CN); Bin Shao, Shanghai (CN)

(73) Assignee: Analog Devices Global, Hamilton (BM)

( * ) Notice: Subject to any disclaimer, the term of this patent is extended or adjusted under 35 U.S.C. 154(b) by 299 days.

(21) Appl. No.: 14/972,800

(22) Filed: Dec. 17, 2015

(65) Prior Publication Data

US 2017/0149361 A1    May 25, 2017

Related U.S. Application Data

(63) Continuation of application No. PCT/CN2015/095031, filed on Nov. 19, 2015.

(51) Int. Cl.
*H02N 2/18*    (2006.01)
(52) U.S. Cl.
CPC .................................. *H02N 2/181* (2013.01)
(58) Field of Classification Search
CPC ..... H02N 2/181; H01L 41/042; H01L 41/107; H01L 41/113
USPC ......................................... 310/317, 318, 319
See application file for complete search history.

(56) References Cited

U.S. PATENT DOCUMENTS

| | | | | |
|---|---|---|---|---|
| 5,594,352 A | * | 1/1997 | Johnson | B06B 1/0215 324/664 |
| 6,222,351 B1 | * | 4/2001 | Fontanella | H02M 3/07 323/222 |
| 2007/0001547 A1 | * | 1/2007 | Sawada | G04C 3/12 310/317 |
| 2011/0285131 A1 | * | 11/2011 | Kwon | F03G 7/08 290/50 |
| 2013/0082570 A1 | * | 4/2013 | Ide | H02N 2/181 310/319 |
| 2014/0247624 A1 | * | 9/2014 | Anderson | H02M 3/335 363/15 |

* cited by examiner

*Primary Examiner* — Bryan Gordon
(74) *Attorney, Agent, or Firm* — Schwegman Lundberg & Woessner, P.A.

(57) ABSTRACT

An electronic circuit can be coupled to an energy harvesting device. The output of the energy harvesting device can provide a damped oscillating waveform elicited from a transient stimulus applied to the energy harvesting device, such as in response to mechanical shock or mechanical impact excitation. A first switch can be coupled between the energy harvesting device and an inductor and configured to selectively connect the input node to the inductor. A second switch can be coupled between the inductor and an energy storage device, the second switch configured to selectively couple the inductor to the energy storage device. A control circuit can be coupled to the first and second switches, such as configured to operate the first and second switches according to one or more of an over bias flip technique, a half bias flip technique, or a bias flip technique.

20 Claims, 8 Drawing Sheets

PIEZOELECTRIC IMPACT ENERGY HARVESTING

CLAIM OF PRIORITY

This application is a continuation under 35 U.S.C. § 111(a) and claims benefit of priority to International Patent Application Serial No. PCT/CN2015/095031, filed on Nov. 19, 2015, which is hereby incorporated by reference herein in its entirety.

BACKGROUND

Electrical energy can be harvested or generated using a variety of techniques. For example, an energy source can include a mechanical-to-electrical conversion device such as a piezoelectric energy harvesting (PEH) device. Another example of an energy source can include a photovoltaic (PV) device, such as a solar cell or a solar array. Yet another example of an energy source can include a thermo-electric generator (TEG). Use of a PEH device, PV device, a TEG, or other energy sources can include coupling such an energy source to a load to provide operating energy for the load. However, there can be a detrimental effect on energy conversion efficiency or power transfer efficiency if the load current or voltage requirements are badly mismatched to the output characteristics of the energy source.

Figure 1A:
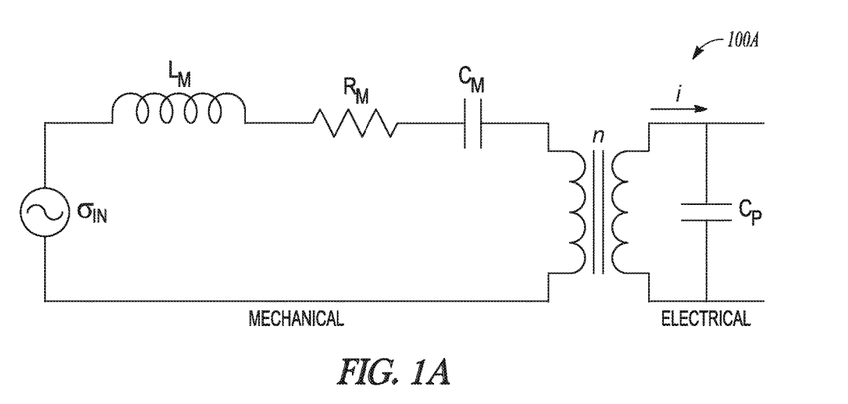
FIG. 1A illustrates generally an example including an equivalent circuit that can model an energy source such as a piezoelectric energy harvesting (PEH) device.

FIG. 1A illustrates generally an example including an equivalent circuit that can model an energy source such as a piezoelectric energy harvesting (PEH) device. The example 100A of FIG. 1A incudes a circuit portion corresponding to a mechanical behavior of the PEH device ("MECHANICAL"), and a circuit portion corresponding to an electrical behavior of the PEH device ("ELECTRICAL"), such as corresponding to a bimorph mechanical configuration that can include a cantilever structure. The mechanical portion of the PEH device can be represented as a mechanical spring-mass-damper system, where $L_M$ can represent the mechanical mass, $C_M$ can represent the spring stiffness, and $R_M$ can represent a damping effect (e.g., mechanical loss), excited by an input mechanical force represented by $\sigma_{IN}$. A current, i, can be provided in response to the input force, such as provided using a model including a coupled inductor structure (e.g., a transformer) having a turns ratio, n. The transformer can represent an element bridging the mechanical and electrical domains.

An electrical portion of the PEH device structure can be modeled as a parallel capacitance, CP, coupled between the output nodes. In generally-available PEH devices, an amplitude of the AC current source is dependent on the acceleration level (e.g., "g" level) induced by vibration. The parallel capacitance CP is generally on the order of about tens of nanoFarads (nF) to hundreds of nF.

In one approach, a PEH device can be electrically coupled to a rectifier circuit. The rectifier circuit is generally coupled to an energy storage element and a load that draws energy from the storage element. The PEH device converts vibrational mechanical energy into a time-varying electrical signal. The time-varying signal is rectified and energy recovered after rectification can be stored into the storage element to provide a supply voltage for a load circuit, such as including a downstream power conversion or regulator circuit. Generally, the PEH device has a non-negligible parasitic capacitance that traps energy. Accordingly, an operating point for maximum power transfer might not be established exclusively using a resistive matching technique. For steady-state operation where the PEH device provides an alternating current (AC) waveform having roughly constant amplitude, a conjugate matching technique can be used such as to compensate for energy trapping occurring in the reactive component of a PEH device source impedance.

OVERVIEW

As mentioned above, a source of electrical energy such as a piezoelectric energy harvesting (PEH) device can convert mechanical energy into electrical energy. A steady-state source of mechanical vibrational energy can be converted into an alternating current (AC) electrical output at the terminals of the PEH device. As mentioned above, in one approach a conjugate matching technique can be used, such as to enhance or maximize power transfer between the PEH device and downstream circuitry such as a power conversion circuit or other load. However, the present inventors have recognized that such an approach can have drawbacks if the PEH device is mechanically excited by a transient mechanical event such as a shock or impact. For example, the PEH device internal resistance can cause dissipative loss for each cycle of damped oscillation, and such oscillation may continue for several cycles because PEH devices generally exhibit a weak piezoelectric coupling factor. Because of the weak coupling factor, energy stored mechanically in the PEH device may be difficult to extract electrically before such mechanical energy is dissipated in the PEH device due to mechanical damping, particularly in the case of impact excitation.

By contrast with passive conjugate matching techniques or use of a passively-operating rectifier and capacitor arrangement, the present inventors have recognized that various techniques can be used to rapidly transfer energy from the PEH device to other circuitry, such as using an active switching approach to reduce an opportunity for damping losses to occur internal to the PEH device after mechanical shock or impact excitation. For example, an inductor can be used, such as coupled to an output of a PEH device using a first switch, and a second switch can be coupled between the inductor and another energy storage device such as an output capacitor. Various switching techniques can include detecting a peak in an output voltage waveform provided by the PEH, then forcing a bias (e.g., a voltage offset) on the output of the PEH device.

In an example that can be referred to as a "half bias flip" technique, the first switch can be controlled to close at a specified time relative to a detected voltage peak to establish a voltage at the output of the PEH device of about zero volts, and opening the first switch when the voltage is about zero volts. The PEH device then continues oscillating, but is offset by a voltage value about the same as the peak voltage. In response to establishing about zero volts at the output of the PEH device, the second switch can be controlled to connect the inductor to the energy storage device for a specified duration to extract energy from the inductor. Such switching can be repeated for successive extrema (peaks and valleys) in the PEH output waveform from the PEH device to extract the remaining energy stored mechanically in the PEH device.

In another example that can be referred to as a "bias flip" technique, the first switch can be controlled close at a specified time relative to the detected voltage peak to establish a voltage at a PEH device output having about the same value as a value of the detected voltage peak but having an opposite polarity including opening the first switch when the opposite polarity is established. The PEH device then continues oscillating, but is offset by about twice the peak voltage. Upon detection of a voltage valley at the input after the detected peak the first switch can be controlled to connect the output of the PEH device to the inductor for a specified first duration, and the second switch can be controlled to connect the inductor to the energy storage device for a specified second duration after the specified first duration to transfer energy from the inductor to the energy storage device.

In yet another example that can be referred to as an "over bias flip" technique, the second switch is controlled to close at a specified time relative to the detected voltage peak to establish an inductor voltage corresponding to a specified bias voltage (e.g., $V_1$) including transferring energy from the energy storage device to the inductor to charge the inductor (e.g., an "invest" portion of the cycle where some energy is transferred from the load direction back to the inductor to charge the inductor). Then, the second switch can be controlled to open and the first switch can be controlled to apply the established inductor voltage to the input. Upon detection of a voltage valley at the input after the detected peak, the first switch can be controlled to connect the input to the inductor for a specified first duration, and the second switch can be controlled to connect the inductor to the energy storage device for a specified second duration after the specified first duration to transfer energy from the inductor to the energy storage device (e.g., a "harvest" portion of the cycle where energy is transferred in the load direction from inductor).

While various examples and techniques described herein mention PEH devices, such examples and techniques are also generally applicable to other transducer types, such as electrostatic or electromagnetic transducers that can provide transient AC output signals, such as in response to a pulsatile excitation (e.g., a mechanical shock or impact).

This overview is intended to provide an overview of subject matter of the present patent application. It is not intended to provide an exclusive or exhaustive explanation of the invention. The detailed description is included to provide further information about the present patent application.

DETAILED DESCRIPTION

Figure 1B:
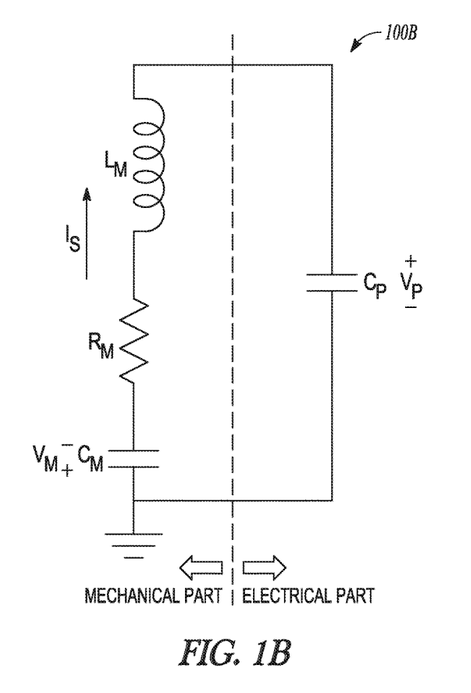
FIG. 1B illustrates generally another example of an equivalent circuit that can model an energy source such as a piezoelectric energy harvesting (PEH) device.

FIG. 1B illustrates generally another example of an equivalent circuit that can model an energy source such as a piezoelectric energy harvesting (PEH) device, such as simplified as compared with FIG. 1A. When a mechanical shock or mechanical impact adds energy to an energy harvesting device such as a PEH device, kinetic energy due to motion or elastic potential energy can be generated and stored mechanically. The stored kinetic energy due to motion can be modeled by an inductor $L_M$ and the stored elastic potential energy can be modeled by the capacitor $C_M$. $C_P$ can model an electrical capacitance (such as associated with a bimorph transducer configuration).

The kinetic and elastic energy components can be transformed into each other during oscillation. For modeling of impact excitation, an initial state just after excitation can be represented as an initial current $I_{ini}$ through the inductor $L_M$. An amplitude of mechanical oscillation gradually decays due to mechanical damping (which can be established in part by $R_M$ where $R_M$ models dissipative mechanical losses). A damping factor, $\xi$, can be used to model such decay.

Generally, a value of $C_M$ is much smaller than a value of $C_P$ (such as $C_M$ having about one tenth the value of $C_P$), so more energy is generally stored in $C_M$ than in $C_P$ during oscillation. Accordingly, if a rectifier and capacitor are used (with or without conjugate matching), many cycles might still need to lapse before the mechanical energy is extracted as electrical energy, and a significant proportion of the stored mechanical energy can be dissipated in the mechanical domain due to mechanical damping.

By contrast with passive conjugate matching techniques or use of a passively-operating rectifier and capacitor arrangement, the present inventors have recognized that various techniques can be used to rapidly transfer energy from the PEH device to other circuitry, such as using an active switching approach to reduce an opportunity for damping losses to occur internal to the PEH device after mechanical shock or impact excitation. While various examples and techniques described herein mention PEH devices, such examples and techniques are also generally applicable to other transducer types, such as electrostatic or electromagnetic transducers that can provide transient AC output signals, such as in response to a pulsatile excitation (e.g., a mechanical shock or impact).

Figure 2:
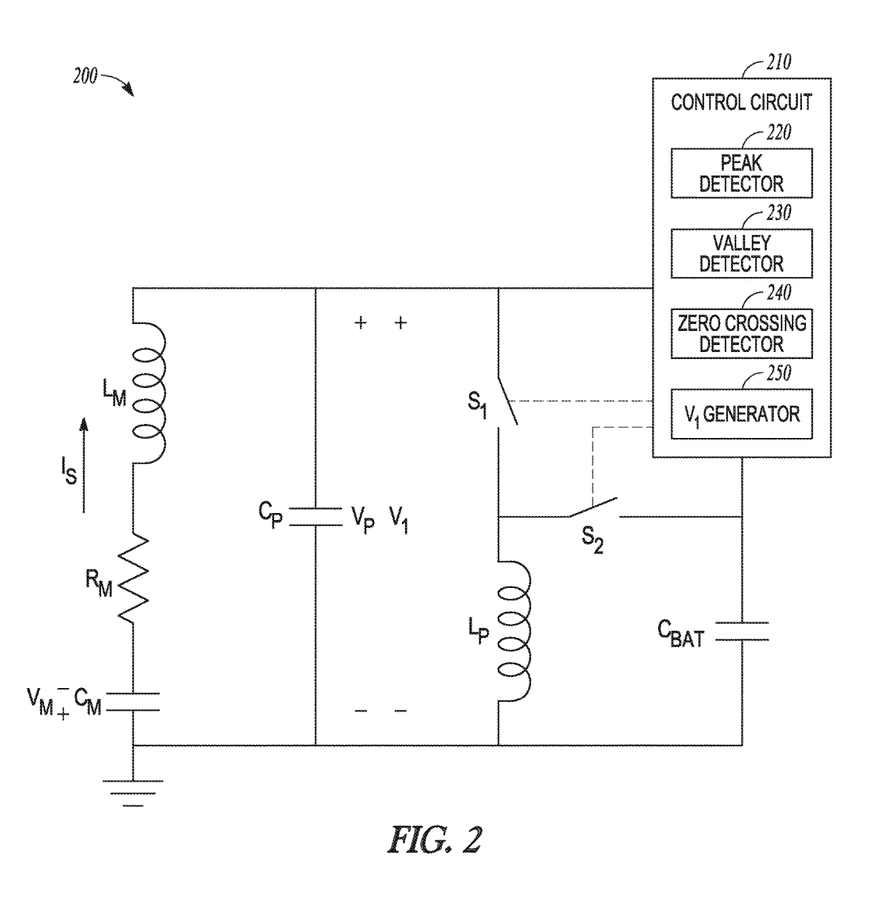
FIG. 2 illustrates generally an example of an electronic circuit that can include a first switch, a second switch, an inductor, and an energy storage device such as a capacitor.

FIG. 2 illustrates generally an example of an electronic circuit 200 that can include a first switch $S_1$, a second switch $S_2$, an inductor $L_P$, and an energy storage device such as a capacitor, $C_{BAT}$ (e.g., an output capacitor). As shown in FIG.

1B, an energy source such as an energy harvesting device can be modeled as an RLC circuit (e.g., including a capacitor $C_M$, a resistor $R_M$, and an inductor $L_M$, in series, with the series RLC elements coupled in parallel with a parallel capacitance $C_P$). A voltage $V_P$ developed across the parallel capacitance $C_P$ can represent an output of the energy harvesting device, such as a piezo electric harvesting (PEH) device. The first switch $S_1$ can be coupled between the output of the PEH device and the inductor $L_P$, and the upper terminal of the first switch $S_1$ can be referred to as the input to the electronic circuit 200 (e.g., an energy harvesting circuit). The second switch $S_2$ can be coupled between the inductor and the energy storage device, $C_{BAT}$. Energy stored in $C_{BAT}$ can be used such as to provide an input for other downstream circuitry such as one or more switching or linear regulators, or for other load 15 circuitry.

A control circuit 210 can be coupled to the first switch $S_1$ and the second switch $S_2$, such as to control one or more of the switch $S_1$ and $S_2$ to perform one of the techniques described elsewhere herein. The control circuit 210 can include or can be coupled to a peak detector circuit 220, such as to detect a peak voltage in the capacitor $C_P$ output voltage $V_P$ waveform from the PEH device and trigger other circuitry. A valley detector circuit 230 can be included, such as to detect a negative peak in the capacitor $C_P$ output voltage $V_P$ waveform from the PEH device and trigger other circuitry. Alternatively or in addition, an absolute value technique can be used such as to provide a magnitude of the voltage $V_P$ and a single peak detector circuit 220 can be used to trigger other circuitry. A zero crossing detector circuit 240 can be used, such as to detect a zero crossing by the capacitor $C_P$ output voltage $V_P$ waveform. A bias voltage ($V_1$) generator circuit 250 can be included, such as to establish a bias voltage or reference voltage for use in performing one or more techniques as shown and described herein.

FIG. 2 is a simplified representation of the electronic circuit 200, which can be implemented various ways. For example, the switches $S_1$ and $S_2$ can include transistors, such as field-effect transistors (FETs) co-integrated as a portion of commonly-shared integrated circuit along with other portions of the electronic circuit 200. As an illustrative example, switches $S_1$ and $S_2$ can be co-integrated with the control circuit 220. Other elements of FIG. 2, such as an inductor $L_P$ and energy storage device, capacitor $C_{BAT}$, can be located "off-chip." The energy harvesting device, such as a PEH device (modeled in FIG. 2 as the combination of $C_P$, $C_M$, $R_M$, and $L_M$) can also be located externally to the integrated circuit. An input to the integrated circuit can include a node coupled to switch $S_1$, with switch $S_1$ connecting such an input selectively to the inductor $L_P$ according to various examples described herein. An output of the integrated circuit can include a node coupled to the energy storage device, $C_{BAT}$.

Over Bias Flip Technique for Impact Energy Harvesting

Figure 3A:
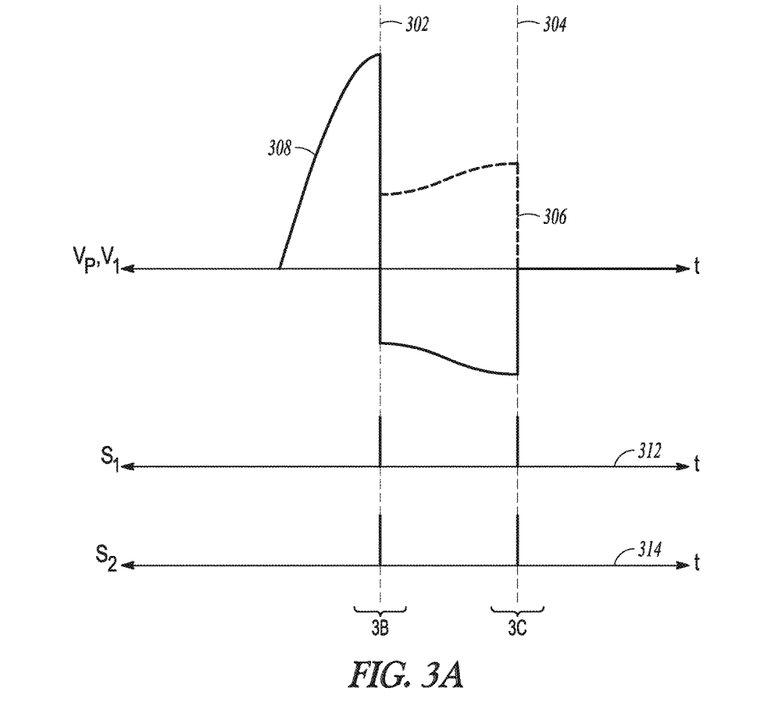
FIG. 3A illustrates generally a technique such as a method that can include an "over bias flip" energy harvesting approach, such as can be performed using the electronic circuit of FIG. 2.
Figure 3B:
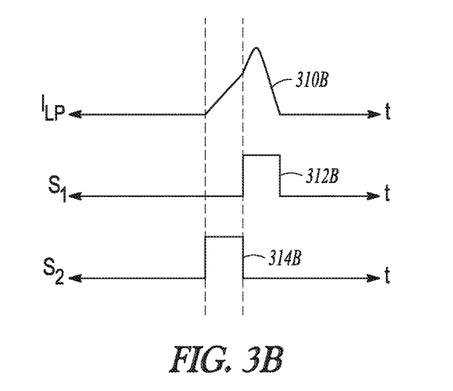
FIGS. 3B and 3C illustrate generally detailed views portions of the first and second switching waveforms shown in FIG. 3A, along with corresponding inductor current waveforms.
Figure 3C:
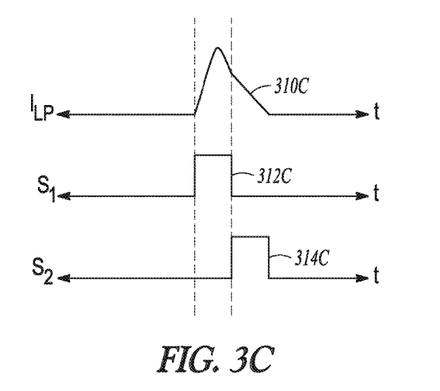

FIG. 3A illustrates generally a technique such as a method that can include an "over bias flip" energy harvesting approach, such as can be performed using the electronic circuit of FIG. 2. FIGS. 3B and 3C illustrate generally detailed views portions of first and second switching waveforms 312 and 314 shown in FIG. 3A, along with corresponding inductor current waveforms 310B and 310C.

Referring to FIG. 2, FIG. 3A, and FIG. 3B, an output voltage $V_P$ 308 across capacitor $C_P$, can ramp upward in response to impact excitation of an energy harvesting device. Switch $S_2$ can be closed at time 302, such as in response to detecting a peak in the output voltage $V_P$ 308. Referring to the detailed view of FIG. 3B, the first switch $S_1$ can remain open at time 302, and the second switch $S_2$ can be closed for a specified duration 314B, such as to charge the inductor $L_P$ until the inductor voltage equals the bias voltage value $V_1$ 308. Then, the second switch $S_2$ can be opened and the first switch $S_1$ can be closed for a specified duration 312B, such as to force capacitor $C_P$ voltage $V_P$ 308 to a value corresponding to a bias voltage $V_1$ 306. The switching sequence shown illustratively in FIG. 3B can be referred to as an "invest" portion of an over bias flip technique, where energy is transferred from the energy storage device (e.g., $C_{BAT}$) to the inductor $L_P$ in order to provide the voltage $V_1$.

Referring to FIG. 2, FIG. 3A, and FIG. 3C, at a later time 304, the first switch $S_1$ can be closed for a specified duration 312C, such as triggered by a negative peak or valley of the capacitor $C_P$ voltage $V_P$ 308. The specified duration 312C can be used to charge the inductor $L_P$ for a duration sufficient to transfer a significant proportion or an entirety of the energy stored in capacitor $C_P$ to the inductor $L_P$, such as terminating at or near a zero crossing of the capacitor $C_P$ voltage $V_P$ 308 waveform. Then, the first switch $S_1$ can be opened and the second switch $S_2$ can be closed for a specified duration 314C, to transfer the energy stored in the inductor $L_P$ to the energy storage device (e.g., $C_{BAT}$). Accordingly, the switching sequence shown illustratively in FIG. 3C can be referred to as "harvest" portion of an over bias flip technique.

Figure 4:
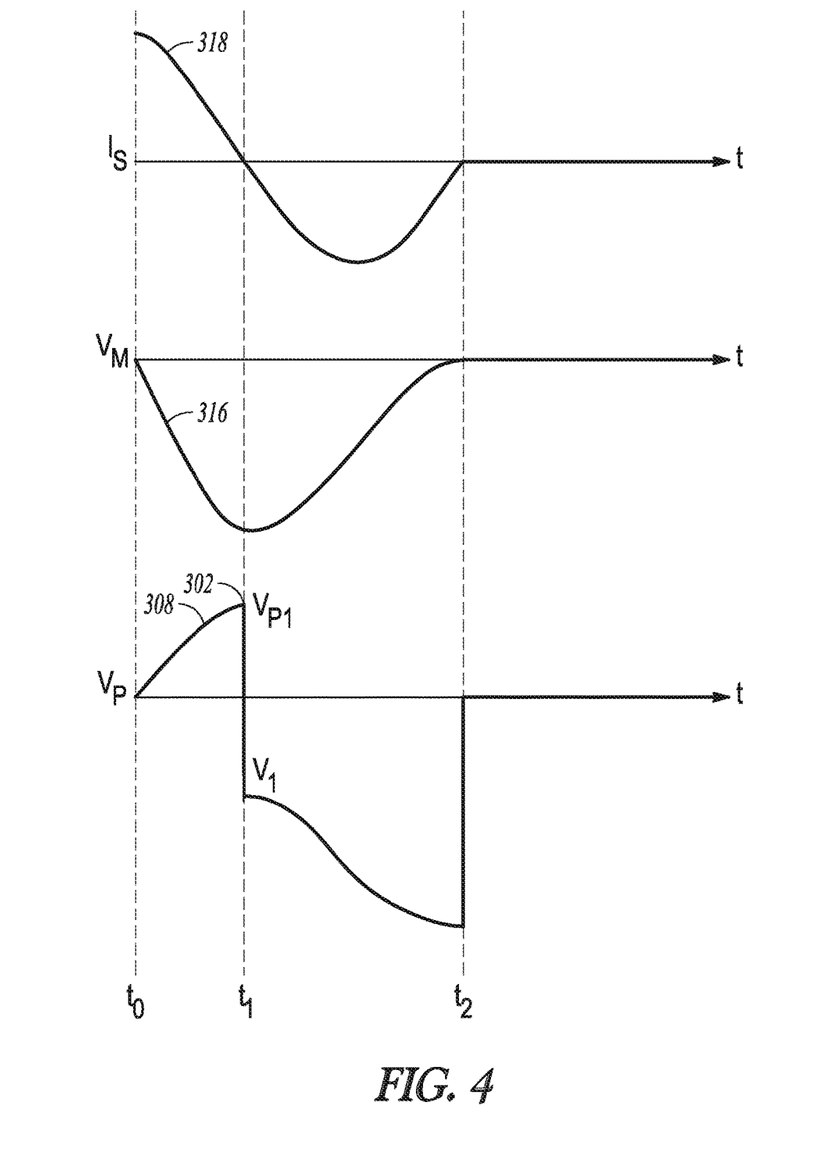
FIG. 4 further illustrates generally a series of operating waveforms, such as can be provided using the technique of FIG. 3A.

FIG. 4 further illustrates generally a series of operating waveforms, such as can be provided using the technique of FIG. 3A. Referring to FIG. 2 and FIG. 4, an inductor current $I_S$ 318 can represent a current established by impact excitation, and a voltage $V_M$ 316 can represent a corresponding voltage corresponding to an elastic component of potential energy stored in the capacitor $C_M$. As in FIG. 3A, $V_P$ 308 can represent a capacitor $C_P$ output voltage.

In the illustrative example of FIG. 4, at $t_0$, an initial current 318 $I_{ini}$ can be flowing through $L_M$ in response to impact excitation and the voltage drop $V_M$ 316 across $C_M$ and $V_P$ 308 across $C_p$ can be represented as zero. After about a quarter period, at time $t_1$, the voltage 308 across capacitor $C_P$ reaches its first peak $V_{P1}$, the current 318 of inductor $L_M$ crosses zero, and the voltage $V_M$ 316 of $C_M$ can be represented as:

$$V_{M1} = -\frac{C_P}{C_M}V_{P1} = -kV_{P1} \qquad \text{EQN. 1}$$

The constant "k" can represent a ratio between the electrical and mechanical capacitances corresponding to the PEH device. The voltage $V_P$ 308 across $C_P$ is then forced from $V_{P1}$ to $V_1$ at 302 in FIG. 4. The time $t_1$ and shortly thereafter can be referred to as the "invest" portion of the switching cycle shown in FIG. 4. The oscillation voltage axis is shifted, and an average voltage of $V_P$ 308 from 302 onward can be represented as:

$$V_{AVG1} = \frac{(V_1 - V_{P1}) * C_P}{C_M + C_P} = \frac{k}{k+1}(V_1 - V_{P1}) \qquad \text{EQN. 2}$$

At time $t_2$, a negative-going peak or valley occurs in $V_P$ 308, and the inductor current $I_S$ 318 is at or near zero volts. The voltage $V_P$ 308 across capacitor $C_P$ can be represented at time $t_2$ as:

$$V_{P2} = V_{AVG1}\left(1 + e^{\frac{-\xi}{2}}\right) - V_1 e^{\frac{-\xi}{2}} \qquad \text{EQN. 3}$$

$$V_{M2} = V_{AVG2}\left(1 + e^{\frac{-\xi}{2}}\right) - V_{M1} e^{\frac{-\xi}{2}} \qquad \text{EQN. 4}$$

The time $t_2$ and shortly thereafter can be referred to as the "harvest" portion of the switching cycle shown in FIG. 4. Because the voltage $V_M$ is at or near zero volts a time $t_2$, which means $V_{M2}=0$, then $$\frac{k}{k+1}(V_1 - V_{P1})\left(1 + e^{\frac{-\xi}{2}}\right) = kV_{P1} e^{\frac{-\xi}{2}} \qquad \text{EQN. 5}$$

A relationship can be established between $V_1$ and $V_{p1}$:

$$V_1 = -\left(\frac{ke^{\frac{-\xi}{2}} - 1}{1 + e^{\frac{-\xi}{2}}}\right) V_{P1} \qquad \text{EQN. 6}$$

The bias voltage $V_1$ can be established by a bias voltage generation circuit, such as using information about the damping factor. A reference value of the voltage $V_1$ (e.g., such as determined according to the expression of EQN. 6) can be used to control the second switch $S_2$, such as to define an on-duration to set the value of $V_P$ across the capacitor $C_P$. The net energy extracted from the energy harvesting device can be represented as:

$$E_{out} = \frac{1}{2} C_P * V_{P2}^2 - \left(\frac{1}{2} C_P * V_1^2 - \frac{1}{2} C_P * V_{P1}^2\right) = C_P V_{P1}^2 \left(\frac{1+k}{1+e^{\frac{\xi}{2}}}\right) \qquad \text{EQN. 7}$$

Generally, the present inventors have recognized that an over bias flip technique, such as described above, can help to force an energy harvesting device such as a piezoelectric energy harvester to stop oscillation very rapidly (such as within a duration of about a cycle). Such an approach can be more efficient than other approaches because the piezoelectric harvester does not have an opportunity to dissipate energy internally through prolonged mechanical oscillation and corresponding mechanical damping.

By establishing the voltage $V_1$ on voltage $V_P$ 308 at about time $t_1$ (e.g., corresponding to the "invest" portion of the switching sequence), the voltage across the capacitor $V_M$ then oscillates naturally to zero at time $t_2$. Accordingly, at time $t_2$, the energy of piezoelectric harvester has been transferred from the mechanical domain from capacitor $C_M$ to the electrical domain in capacitor $C_P$, and such energy can then extracted using the inductor $L_P$ as described above during the "harvest" portion of a switching sequence.

Half Bias Flip Technique for Impact Energy Harvesting

Figure 5A:
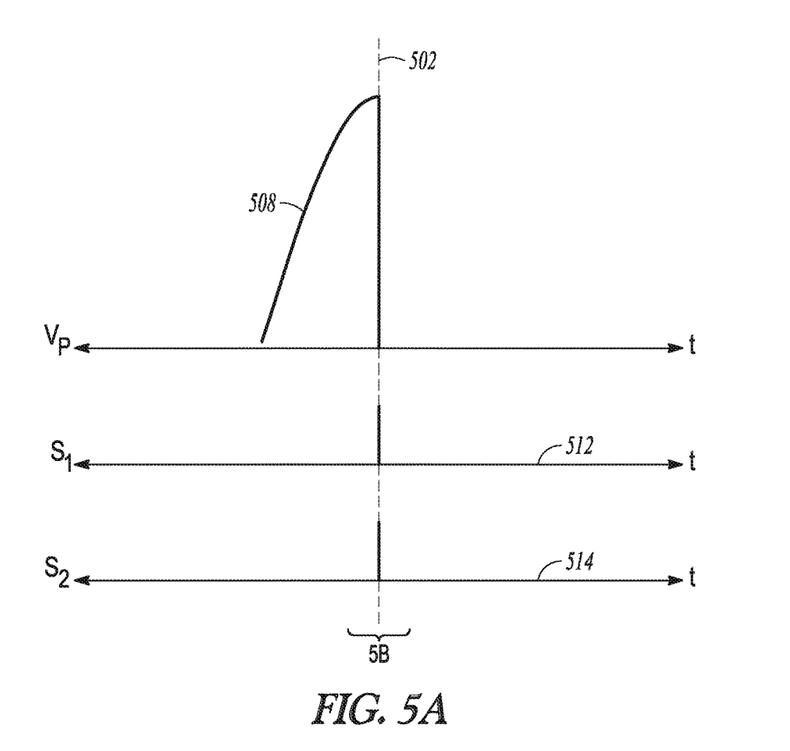
FIG. 5A illustrates generally a technique, such as a method, that can include a "half bias flip" energy harvesting approach, such as can be performed using the electronic circuit of FIG. 2.
Figure 5B:
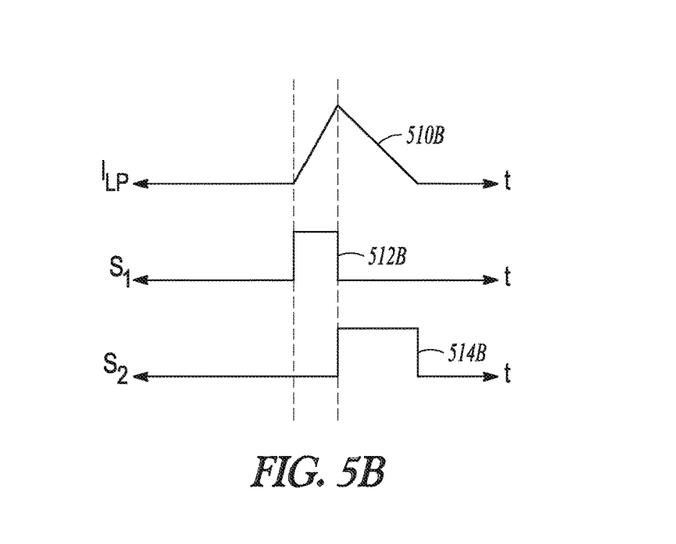
FIG. 5B illustrates generally a detailed view of a portion of the first and second switching waveforms shown in FIG. 5A, along with a corresponding inductor current waveform.

FIG. 5A illustrates generally a technique, such as a method, that can include a "half bias flip" energy harvesting approach, such as can be performed using the electronic circuit of FIG. 2. FIG. 5B illustrates generally a detailed view of a portion of the first and second switching waveforms 512 and 514 shown in FIG. 5A, along with a corresponding inductor current waveform 510B.

Referring to FIG. 2, FIG. 5A, and FIG. 5B, an output voltage $V_P$ 508 across capacitor $C_P$, can ramp upward in response to impact excitation of an energy harvesting device. Switch $S_1$ can be closed at time 502, such as for a specified duration 512B and such as in response to a detected peak in the output voltage $V_P$ across capacitor $C_P$. Referring to the detailed view of FIG. 5B, the specified duration 512B can be used to set the voltage $V_P$ 508 to about zero volts, charging the inductor $L_P$ as shown by the current waveform 510B. For example, the specified duration 512B can be set using a zero crossing detector circuit, with switch $S_1$ closed in response to a detected peak in voltage $V_P$ 508, and then opened in response to a detected zero crossing in voltage $V_P$ 508. After the first switch is opened, the second switch $S_2$ can be closed for a specified duration 514B to transfer energy from the inductor $L_P$ to the energy storage device (e.g., $C_{BAT}$).

As discussed below in relation to FIG. 6, the switching cycle shown in FIG. 5A and FIG. 5B will generally be insufficient to completely arrest oscillation in the energy harvesting device. Accordingly, subsequent positive-going peaks or negative-going peaks (e.g., valleys) in the capacitor $C_P$ voltage $V_P$ 508 can also be used to trigger a switching cycle similar to FIG. 5B, where $S_1$ is closed to force $V_P$ 508 to about zero volts to charge the inductor $L_P$, and then $S_2$ is closed to transfer stored energy from the inductor $L_P$ to the energy storage device (e.g., $C_{BAT}$). The specified duration 514B can be determined such as by monitoring an inductor $L_P$ current. For example, when the inductor $L_P$ current is about zero or near zero, switch $S_2$ can be opened.

Figure 6:
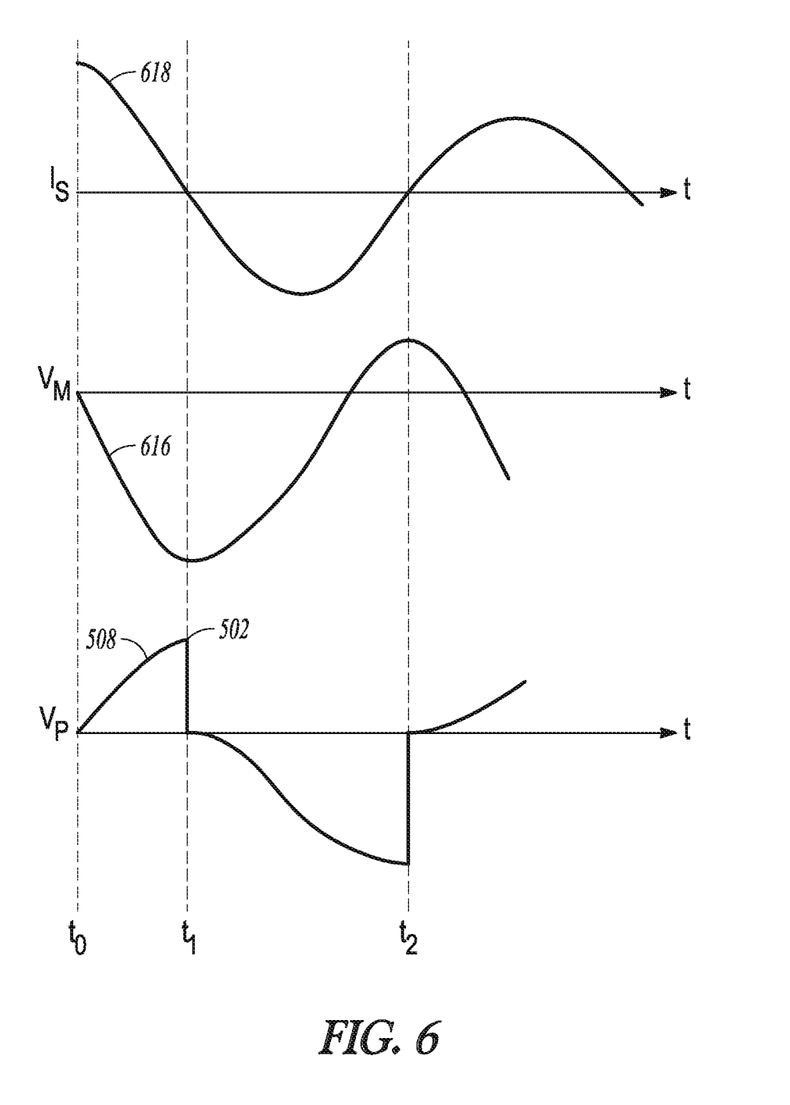
FIG. 6 further illustrates generally a series of operating waveforms, such as can be provided using the technique of FIG. 5A.

FIG. 6 further illustrates generally a series of operating waveforms, such as can be provided using the technique of FIG. 5A. Referring to FIG. 2 and FIG. 6, an inductor current $I_S$ 618 can represent a current established by impact excitation, and a voltage $V_M$ 616 can represent a corresponding voltage corresponding to an elastic component of potential energy stored in the capacitor $C_M$. As in FIG. 5A, $V_P$ 508 can represent a capacitor $C_P$ output voltage.

As in the illustrative example of FIG. 4, in FIG. 6, an initial current in the inductor $L_M$ is established after impact, triggering damped oscillation in the absence of further external electrical or mechanical forcing. At $t_0$, an initial current 618 $I_{ini}$ can be flowing through $L_M$ in response to impact excitation and the voltage drop $V_M$ 616 across $C_M$ and VP 508 across $C_P$ can be represented as zero. After about a quarter period, at time $t_1$, the voltage 508 across capacitor $C_P$ reaches its first peak $V_{P1}$, the current 318 of inductor $L_M$ crosses zero, and the voltage $V_M$ 616 of $C_M$ can be represented as:

$$V_{M1} = -\frac{C_P}{C_M} V_{P1} \qquad \text{EQN. 8}$$

The energy stored in $C_P$ can be extracted and transferred to the inductor $L_P$. Generally, the inductor $L_P$ has a value that is much smaller in magnitude than a value $L_M$ corresponding to the mechanical part of the energy harvesting transducer. Accordingly, a state change in the mechanical part of transducer can be ignored. At 502, the voltage $C_P$ 508 is forced to zero. The oscillation voltage axis is shifted, and an average voltage of $V_P$ 508 from 502 onward can be represented as:

$$V_{AVG1} = -\frac{V_{M1} * C_M}{C_M + C_P} = -\frac{1}{k+1} V_{M1}, \text{ where } k = \frac{C_P}{C_M} \quad \text{EQN. 9}$$

At time $t_2$, a negative-going peak or valley occurs in $V_P$ 508, and the inductor current $I_S$ 618 is at or near zero. The voltage $V_P$ 508 across capacitor CP can be represented at time $t_2$ as:

$$V_{P2} = -\frac{1}{k+1} V_{M1} \left(1 + e^{-\frac{\xi}{2}}\right) \quad \text{EQN. 10}$$

$$V_{M2} = V_{AVG1}\left(1 + e^{-\frac{\xi}{2}}\right) - V_{M1} e^{-\frac{\xi}{2}} \quad \text{EQN. 11}$$

Again, the energy stored in $C_P$ can be extracted and transferred to the inductor $L_P$ and the oscillation voltage axis is shifted again. An average voltage of $V_P$ 508 from time $t_2$ onward can be represented as:

$$V_{AVG2} = \frac{V_{M2} * C_M}{C_M + C_P} = \frac{1}{k+1} V_{M2} \quad \text{EQN. 12}$$

For successive partial cycles after time $t_2$, the average voltage of $V_P$ for each partial cycle can be generalized and represented by:

$$V_{AVGi} = \frac{V_{Mi} * C_M}{C_M + C_P} = \frac{1}{k+1} V_{Mi} \quad \text{EQN. 13}$$

$$V_{P(i+1)} = -\frac{k}{k+1} V_{Pi}\left(1 + e^{-\frac{\xi}{2}}\right) \quad \text{EQN. 14}$$

$$V_{M(i+1)} = V_{AVGi}\left(1 + e^{-\frac{\xi}{2}}\right) - V_{Mi} e^{-\frac{\xi}{2}} \quad \text{EQN. 15}$$

In EQNS. 13 through 15 above, i can represent an iteration number, and the total energy extracted over a series of "n" cycles can be represented as:

$$E_{out} = \sum_{i=1}^{n} \frac{1}{2} C_P * V_{Pi}^2 \quad \text{EQN. 15}$$

When using the half bias flip technique, a lower limit to $V_P$ can be set. For example, if $V_P$ decays and fails to exceed an extraction voltage threshold value $V_{CP}$, then further extraction can be suppressed. When $V_P$ has substantially decayed, the extraction switching cycle may dissipate more energy than the remaining energy available to be extracted from the energy harvesting device.

Bias Flip Technique for Impact Energy Harvesting

Figure 7A:
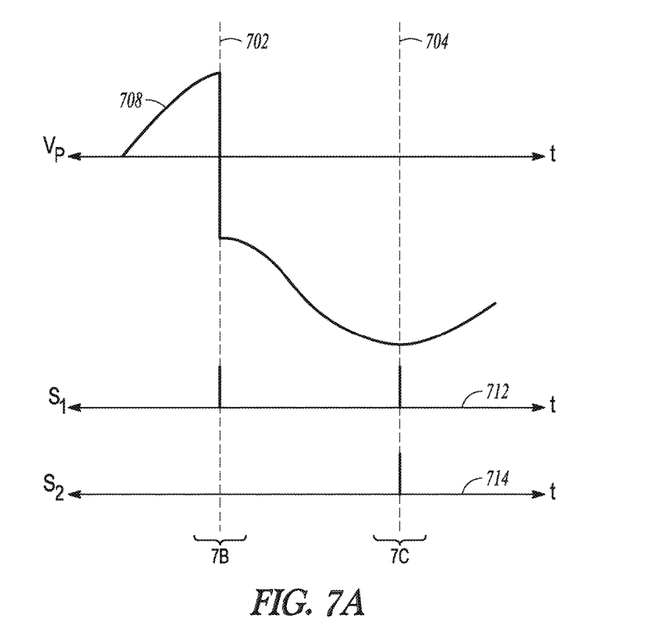
FIG. 7A illustrates generally a technique such as a method that can include a "bias flip" energy harvesting approach, such as can be performed using the electronic circuit of FIG. 2.
Figure 7B:
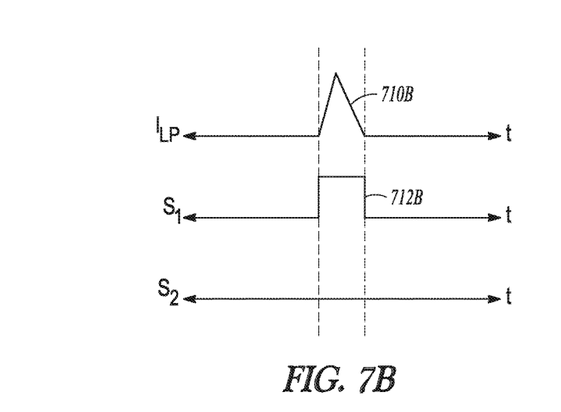
FIGS. 7B and 7C illustrate generally detailed views portions of the first and second switching waveforms shown in FIG. 7A, along with corresponding inductor current waveforms.
Figure 7C:
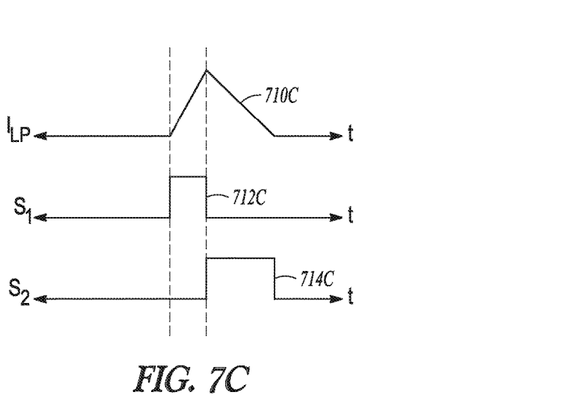

FIG. 7A illustrates generally a technique such as a method that can include a "bias flip" energy harvesting approach, such as can be performed using the electronic circuit of FIG. 2. FIGS. 7B and 7C illustrate generally detailed views portions of the first and second switching waveforms 712 and 714 shown in FIG. 7A, along with corresponding inductor current waveforms 710B and 710C.

Referring to FIG. 2, FIG. 7A, and FIG. 7B, an output voltage $V_P$ 708 across capacitor $C_P$, can ramp upward in response to impact excitation of an energy harvesting device. Switch $S_2$ can be closed at time 702, such as in response to detecting a peak in the output voltage $V_P$ 708. Referring to the detailed view of FIG. 7B, the first switch $S_1$ can be closed for a duration 712B to set the voltage $V_P$ 708 to a value corresponding to a peak value at time 702, but having the opposite polarity, charging and discharging the inductor $L_P$ as shown by the current waveform 710B. For example, the specified duration 712B can be set using a zero crossing detector circuit, with switch $S_1$ closed in response to a detected peak in voltage $V_P$ 708, and then opened in response to a detected zero crossing in inductor current $I_{LP}$ 710B. Voltage $V_P$ 708 can continue oscillating, but having an offset voltage as shown in FIG. 7A.

Referring to FIG. 2, FIG. 7A, and FIG. 7C, at a later time 704, the first switch $S_1$ can be closed for a specified duration 712C, such as triggered by a negative peak or valley of the capacitor $C_P$ voltage $V_P$ 708. The specified duration 712C can be used to charge the inductor $L_P$ for a duration sufficient to transfer a significant proportion or an entirety of the energy stored in capacitor $C_P$ to the inductor $L_P$. Then, the first switch $S_1$ can be opened and the second switch $S_2$ can be closed for a specified duration 714C, to transfer the energy stored in the inductor $L_P$ to the energy storage device (e.g., $C_{BAT}$). The specified duration 714C can be determined such as by monitoring an inductor $L_P$ current. For example, when the inductor $L_P$ current 710C is about zero or near zero, switch $S_2$ can be opened.

Figure 8:
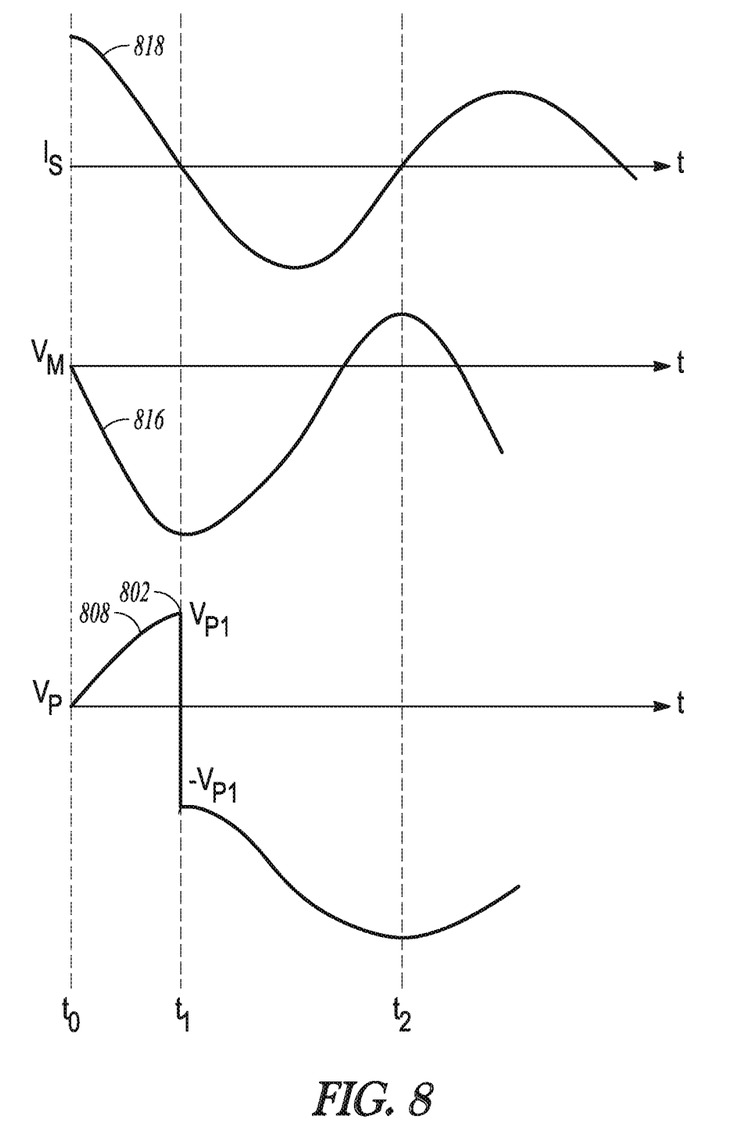
FIG. 8 further illustrates generally a series of operating waveforms, such as can be provided using the technique of FIG. 7A.

FIG. 8 further illustrates generally a series of operating waveforms, such as can be provided using the technique of FIG. 7A. As in the illustrative example of FIG. 4 and FIG. 6, in FIG. 8, at $t_0$, an initial current 818 $I_{ini}$ can be flowing through $L_M$ in response to impact excitation and the voltage drop VM 816 across $C_M$ and $V_P$ 808 across $C_P$ can be represented as zero. After about a quarter period, at time $t_1$, the voltage 808 across capacitor $C_P$ reaches its first peak $V_{P1}$, the current 818 of inductor $L_M$ crosses zero, and the voltage $V_M$ 816 of $C_M$ can be represented as:

$$V_{m1} = -\frac{C_P}{C_M} V_{p1} \quad \text{EQN. 16}$$

As mentioned above in relation to FIG. 7A, when a capacitor $C_P$ voltage $V_P$ 808 reaches a peak at 802, the voltage $V_P$ can be forced from a value $V_{P1}$ to a value $-V_{P1}$ at time $t_1$. In particular, the voltage $V_P$ 808 can be "flipped" by the inductor $L_P$ through oscillation in resonance and the resonant frequency of such oscillation can be much higher than the natural frequency of oscillation of the energy harvesting device. Generally, the inductor $L_P$ has a value that is much smaller in magnitude than a value $L_M$ corresponding to the mechanical part of the energy harvesting transducer. Accordingly, a state change in the mechanical part of transducer can be ignored. The oscillation voltage axis of $V_P$ is shifted, and an average voltage of $V_P$ 808 from 802 onward can be represented as:

$$V_{AVG1} = -\frac{2V_{P1} * C_P}{C_M + C_P} = \frac{-2k}{k+1} V_{P1} \quad \text{EQN. 17}$$

At time $t_2$, a negative-going peak or valley occurs in $V_P$ 808, and the inductor current $I_S$ 818 is at or near zero. The voltage $V_P$ 808 across capacitor CP can be represented at time $t_2$ as:

$$V_{P2} = V_{AVG1}\left(1 + e^{\frac{-\xi}{2}}\right) - V_{P1}e^{\frac{-\xi}{2}} \quad \text{EQN. 18}$$

$$V_{M2} = V_{AVG1}\left(1 + e^{\frac{-\xi}{2}}\right) - V_{M1}e^{\frac{-\xi}{2}} \quad \text{EQN. 19}$$

When the energy stored in $C_P$ is extracted out at time $t_2$, the net energy extracted from the energy harvesting device can be represented as:

$$E_{out} = \tfrac{1}{2}C_P * V_{P2}^2 \quad \text{EQN. 20}$$

Comparison of Different Impact Energy Harvesting Techniques

The energy harvesting techniques described herein can be simulated, and compared to a full-wave rectification approach. For example, TABLE 1 illustrates generally a set of parameters that can be used to simulate the performance of the energy harvesting techniques described herein, such as corresponding to parameters for a generally-available PEH device.

TABLE 1

Simulated PEH Device Parameters

| Parameter | Value |
|---|---|
| $L_M$ | 2582 Henry |
| $R_M$ | 40.2 KiloOhm |
| $C_M$ | 5 nanoFarad |
| $C_P$ | 50 nanoFarad |
| $\omega_n$ | 45.9 Hertz |
| Damping Factor ($\Xi$) | 0.17 |

An initial current $I_{ini}$ through $L_M$ can be set at 100 microamperes (µA). A resulting harvested energy can be determined using simulation. For example, voltage and current values can be determined using simulation, and output energy equations can then be calculated using the extracted voltage and current values (e.g., using EQN. 7, EQN. 15, and EQN. 20). For the purposes of simulation, voltages developed across switches $S_1$ and $S_2$ can be ignored. In practice, if transistors or used to implement switches $S_1$ and $S_2$, some voltage drop would occur across each switch. An efficiency can be represented by:

$$\eta = \frac{E_{out}}{E_{in}} = \frac{E_{out}}{\frac{1}{2}*L_M*I_{ini}^2} \quad \text{EQN. 21}$$

TABLE 2

Simulated Efficiency of Different Techniques

| Extraction method | Voltage change | Efficiency ($\eta$) |
|---|---|---|
| Simple Rectification | None | 21.9% |
| Half bias flip (e.g., FIG. 5A) | V1 = 0<br>V1 = $-V_{P1}$ | 65.8%<br>55.9% |
| Bias flip (e.g., FIG. 7A) | | |
| Over bias flip (e.g., FIG. 3A) | $V_1 = -\left(\dfrac{ke^{\frac{-\xi}{2}} - 1}{1 + e^{\frac{-\xi}{2}}}\right)V_{P1}$ | 88.4% |

According to simulation results shown in TABLE 2, an "over bias flip" technique provides the best energy efficiency relative to the other simulated techniques, and offers an efficiency about four times better than a rectification approach. Without being bound by theory, in some cases, the "half bias flip" technique appears to provide better efficiency than the "bias flip" technique at least in part due to having less mechanical damping, because the "bias flip" technique generally only extracts energy once (e.g., at time $t_2$). However, in an example where mechanical damping is more significant, the "bias flip" technique can provide better efficiency than the "half bias flip" technique, such as where a mechanical damping value is larger than about 0.325.

Additional Notes

Each of the non-limiting examples discussed in this document can stand on its own, or can be combined in various permutations or combinations with one or more of the other examples. The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An electronic circuit, comprising:
an input configured to receive a signal from an output of an energy harvesting device, the signal comprising a damped oscillating waveform elicited from a transient stimulus applied to the energy harvesting device;
a first switch coupled between the input and an inductor and configured to selectively connect the input node to the inductor;
a second switch coupled between the inductor and an energy storage device and configured to selectively couple the inductor to the energy storage device;
a control circuit comprising a peak detection circuit and a valley detection circuit, the control circuit configured to control the states of the first and second switches, and the peak detection and valley detection circuits coupled to the input;
wherein in response to detection of a voltage peak at the input as indicated by the peak detection circuit, the control circuit is configured to:
control the first switch to close at a specified time relative to the detected voltage peak to perform a bias flip technique including, using the inductor, establishing a voltage at the input having about the same value as a value of the detected voltage peak but having an opposite polarity including opening the first switch when the opposite polarity is established; and
upon detection of a voltage valley at the input after the detected peak as indicated by the valley detection circuit, control the first switch to connect the input to the inductor for a specified first duration, and control the second switch to connect the inductor to the energy storage device for a specified second duration after the specified first duration to transfer energy from the inductor to the energy storage device.

2. The electronic circuit of claim 1, wherein the control circuit is configured to control the first switch to establish the voltage at the input having the opposite polarity including opening the first switch when the inductor current decays to about zero.

3. The electronic circuit of claim 1, wherein the control circuit is configured to establish the second specified duration corresponding to the inductor current decaying to about zero.

4. The electronic circuit of claim 1, wherein the energy harvesting device comprises a piezoelectric energy harvesting device; and
wherein the transient stimulus comprises one or more of a mechanical shock or mechanical impact.

5. The electronic circuit of claim 1, wherein the energy storage device comprises a capacitor.

6. The electronic circuit of claim 1, wherein the first and second switches comprise transistors.

7. The electronic circuit of claim 1, wherein the control circuit comprises an integrated circuit, and wherein one or more of the energy storage device, the inductor, the first switch, and the second switch are located external to the integrated circuit.

8. An electronic circuit, comprising:
an input configured to receive a signal from an output of an energy harvesting device, the signal comprising a damped oscillating waveform elicited from a transient stimulus applied to the energy harvesting device;
a first switch coupled between the input and an inductor and configured to selectively connect the input node to the inductor;
a second switch coupled between the inductor and an energy storage device and configured to selectively couple the inductor to the energy storage device;
a control circuit comprising a peak detection circuit, the control circuit configured to control the states of the first and second switches, and the peak detection circuit coupled to the input;
wherein in response to detection of a voltage peak at the input, the control circuit is configured to:
control the first switch to close at a specified time relative to the detected voltage peak to perform a half bias flip technique including, using the inductor, establishing a voltage at the input of about zero volts, and opening the first switch when the voltage is about zero volts; and
in response to establishing a voltage at the input of about zero volts, control the second switch to connect the inductor to the energy storage device for a specified duration to extract energy from the inductor.

9. The electronic circuit of claim 8, wherein the control circuit comprises a zero crossing detector circuit, and wherein the control circuit is configured to control the first switch to establish the voltage at the input of about zero volts including opening the first switch when the voltage is about zero volts as indicated by the zero crossing detector circuit.

10. The electronic circuit of claim 8, wherein the control circuit is configured to establish the specified duration corresponding to the inductor current decaying to about zero.

11. The electronic circuit of claim 8, wherein the energy harvesting device comprises a piezoelectric energy harvesting device; and
wherein the transient stimulus comprises one or more of a mechanical shock or mechanical impact.

12. The electronic circuit of claim 8, wherein the energy storage device comprises a capacitor.

13. The electronic circuit of claim 8, wherein the first and second switches comprise transistors.

14. The electronic circuit of claim 8, wherein the control circuit comprises an integrated circuit, and wherein one or more of the energy storage device, the inductor, the first switch, and the second switch are located external to the integrated circuit.

15. An electronic circuit, comprising:
an input configured to receive a signal from an output of an energy harvesting device, the signal comprising a damped oscillating waveform elicited from a transient stimulus applied to the energy harvesting device;
a first switch coupled between the input and an inductor and configured to selectively connect the input node to the inductor;
a second switch coupled between the inductor and an energy storage device and configured to selectively couple the inductor to the energy storage device;
a control circuit comprising a peak detection circuit, a valley detection circuit, and a bias voltage generation circuit, the control circuit configured to control the states of the first and second switches, and the peak detection and valley detection circuits coupled to the input;
wherein in response to detection of a voltage peak at the input, the control circuit is configured to:
control the second switch to close at a specified time relative to the detected voltage peak to establish an inductor voltage corresponding to the specified bias voltage including transferring energy from the energy storage device to the inductor;
open the second switch and control the first switch to apply the established inductor voltage to the input; and
upon detection of a voltage valley at the input after the detected peak, control the first switch to connect the input to the inductor for a specified first duration, and control the second switch to connect the inductor to the energy storage device for a specified second duration after the specified first duration to transfer energy from the inductor to the energy storage device.

16. The electronic circuit of claim 15, wherein the bias voltage is established at least in part using information about a damping coefficient corresponding to the energy harvesting device.

17. The electronic circuit of claim 15, wherein the bias voltage is established at least in part using information about a ratio of a mechanical capacitance contribution to an electrical capacitance contribution corresponding to the energy harvesting device.

18. The electronic circuit of claim 17, wherein the bias voltage is represented by $V_1$ and is established according to an expression, $$V_1 = -\left(\frac{ke^{-\frac{\xi}{2}} - 1}{1 + e^{-\frac{\xi}{2}}}\right)V_{P1}$$

wherein k represents the ratio of the mechanical capacitance contribution to the electrical capacitance contribution corresponding to the energy harvesting device, $\xi$ represents a damping coefficient corresponding to the energy harvesting device, and $V_P$ represents a peak voltage provided at the input.

19. The electronic circuit of claim 17, wherein the energy harvesting device comprises a piezoelectric energy harvesting device; and
wherein the transient stimulus comprises one or more of a mechanical shock or mechanical impact.

20. The electronic circuit of claim 17, wherein the energy storage device comprises a capacitor.

* * * * *